United States Patent

Haun et al.

Patent Number: 5,210,057
Date of Patent: May 11, 1993

[54] PARTIALLY CRYSTALLIZABLE GLASS COMPOSITIONS

[76] Inventors: Michael J. Haun, 11 S. Holman Way, Golden, Colo. 80401; Kenneth W. Hang, 816 Nathan Hale Dr., West Chester, Pa. 19382; Arvind Halliyal, No. 5 Donegan Ct., Newark, Del. 19711

[21] Appl. No.: 883,817

[22] Filed: May 13, 1992

Related U.S. Application Data

[63] Continuation-in-part of Ser. No. 653,872, Feb. 8, 1991, abandoned.

[51] Int. Cl.$^5$ ............................................. C03C 3/085
[52] U.S. Cl. ...................................... 501/69; 501/70; 501/72
[58] Field of Search ............................ 501/69, 70, 72

[56] References Cited

U.S. PATENT DOCUMENTS

| | | | |
|---|---|---|---|
| 3,754,881 | 8/1973 | Petticrew | 65/33 |
| 3,964,917 | 6/1976 | Nakamura | 106/39.6 |
| 4,323,652 | 4/1982 | Baudry et al. | 501/69 X |
| 4,358,541 | 11/1982 | Andrus et al. | 501/73 X |
| 4,613,648 | 9/1986 | Usala | 524/555 |
| 4,853,349 | 8/1989 | Martin | 501/8 |
| 4,959,330 | 9/1990 | Donohue et al. | 501/69 X |

FOREIGN PATENT DOCUMENTS 0262974 1/1987 European Pat. Off. .

OTHER PUBLICATIONS

*Chemical Abstracts*, vol. 108, No. 14, Apr. 4, 1988, Abstract No. 117549A, p. 330.
*Silikattechnik*, vol. 28, No. 7, Jul., 1977, pp. 199–201, H. Walter "Werkstoffe im System BaO-ZnO-SiO$_2$".
*Journal of Materials Science*, vol. 20, No. 10, Oct., 1985, pp. 3428–3438, Zu-Xiong Chen et al., "Microstructure and Properties of MgO-ZnO-SiO$_2$ Alkali-Free Glass Ceramics".

Primary Examiner—Mark L. Bell
Assistant Examiner—Chris Gallo

[57] ABSTRACT

An amorphous partially crystallizable alkaline earth zinc silicate glass containing ZrO$_2$ and optionally small amounts of Al$_2$O$_3$, HfO$_2$, P$_2$O$_5$ and TiO$_2$.

13 Claims, 4 Drawing Sheets

PARTIALLY CRYSTALLIZABLE GLASS COMPOSITIONS

This is a continuation-in-part, division of application Ser. No. 07/653,872 filed Feb. 8, 1991, now abandoned.

FIELD OF INVENTION

The invention relates to partially crystallizable glass compositions and especially to such compositions which are suitable for use as dielectric layers in microelectronic applications.

BACKGROUND OF INVENTION

Dielectric materials have traditionally been used for insulating conductor patterns on ceramic substrates. The principal properties required for many such applications have been the electrical properties such as insulation resistance and dissipation factor of the dielectric, as measured with the conductor of choice. Many dielectric materials in use for many years have been non-hermetic type dielectrics; that is, they may contain a significant micro-porosity while meeting all other needs for making crossover and low-layer count multilayers. Typically the choice of thick film conductor (Ag, Cu, Ni or Au) dictated the level of reliability that the circuit may possess due to the tendency of the conductor to migrate and short circuit when exposed to humidity and electric field in use. Noble metals like gold are the most reliable, while base metals like silver are the least reliable. The cost was approximately proportional to the need for reliability.

The trend of the electronic industry has been toward higher circuit (closer conductor lines) and higher reliability requirements, while at the same time intense pressure for lower costs of manufacture has driven the circuit manufacturer to consider the use of less costly metals such as silver and copper. The industry has been moving toward the use of multilayer circuits. The use of double sided boards with crossovers and finer conductor line geometries, however, has been the first stage in this trend.

To permit the manufacture of reliable circuits, utilizing base metal conductors, dielectric materials which resist migration of conductive materials on the surface or through the bulk of the dielectric are necessary. Since moisture plays a large role in the migration of conductive phases, hermetic dielectric materials are essential. Once the conductor line is sealed between layers of hermetic dielectric, conductor migration ceases to be a serious reliability risk.

In addition, however, to the requirements for sealed conductor structures, the thermal expansion of the dielectric must be carefully matched to the substrate material. The dielectric must also be capable of undergoing multiple reheat cycles to the firing temperature (usually 850° C.) without continued migration of the conductive flux through the dielectric. In complex circuits, a large number of refires are frequently necessary. Large numbers of refires and the necessity to reduce cost have made the possiblity of co-firing pairs of layers in a multilayer circuit quite desirable.

Most multilayer dielectrics are mixtures of glass and refractory ceramic oxides. They tend to be porous because they are normally formulated with organic binder materials which evolve decomposition gases during thermal processing of applied layers of dielectric, thus leaving open passages in the formed dielectric layers through which these gases have escaped. For this reason multiple print and firing of dielectric layers is commonly performed to close connected porosity.

Many available dielectric materials, after repeated firing of circuits, develop leaky, soft shorts or some hard shorted paths when the dielectric layers are degraded by flux penetration from the base metal conductor. These flux materials after repeated firing chemically reduce to their respective metals/alloys yielding a variety of electrical failure possibilities. The flux materials can become conductive by reduction reactions triggered by binder exhaust gases and residual carbon in the materials.

SUMMARY OF THE INVENTION

The invention is directed generally to a family of amorphous, partially crystallizable alkaline earth zinc silicate glass compositions which can be used to prepare dielectric layers either by screen printing in the form of a thick film paste or by lamination in the form of a green tape.

In a first aspect, the invention is directed to an amorphous, partially crystallizable alkaline earth zinc silicate glass consisting essentially of a composition falling within the area defined in mole % by points g through l of FIG. 2 of the Drawing in which:

(1) alpha is $SiO_2$ in combination with a glass former or conditional glass former selected from the group consisting of no more than 3% $Al_2O_3$, 6% $HfO_2$, 4% $P_2O_5$, 10% $TiO_2$, 6% $ZrO_2$ and mixtures thereof, with the proviso that the composition contains at least 0.5% $ZrO_2$;

(2) beta is an alkaline earth selected from CaO, SrO, MgO and mixtures thereof, with the proviso that it contain no more than 15% MgO; and (3) gamma is ZnO.

In a second aspect, the invention is directed to the above described glass in which:

(1) alpha contains $Al_2O_3$ up to 3% plus $\frac{2}{3}$ of the % of BaO and constitutes with respect to the total glass composition no more than 48% plus the % of BaO;

(2) beta contains up to 6% BaO and constitutes with respect to the total glass composition no more than 33% plus $\frac{1}{3}$ of the % of BaO; and (3) gamma constitutes no more than 36% minus $\frac{2}{3}$ of the % of BaO.

In a further aspect, the invention is directed to novel methods of making such glasses.

In a still further aspect, the invention is directed to the manufacture and use of green tapes for use in making dielectric layers from such glasses.

Prior Art

Figure 1:
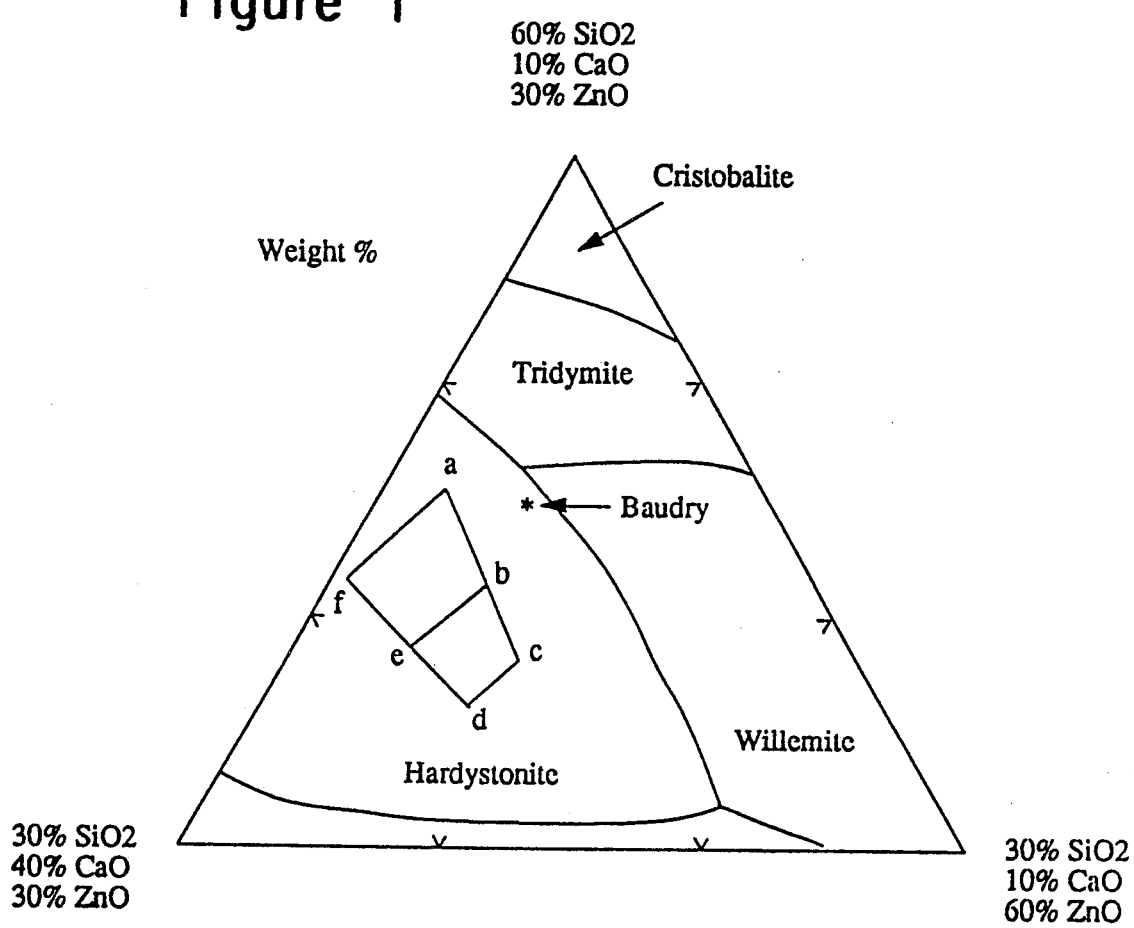
FIG. 1 is a ternary phase diagram of a portion of the CaO-ZnO-SiO2 system bounded by the points: 30% wt. ZnO, 10% CaO and 60% $SiO_2$; 10% CaO, 60% ZnO and 30% $SiO_2$; and 40% CaO, 30% ZnO and 30% $SiO_2$.

U.S. Pat. No. 4,323,652, Baudry et al.

The patent is directed to dielectric compositions consisting essentially of 60-85% of a vitreous phase and 40-15% wt. of a ceramic phase. The composition of the vitreous phase is given below:

| Component | Glass Composition (mole %) | Preferred Composition (mole %) | Spontaneously Devitrifiable Composition (mole %) |
|---|---|---|---|
| CaO + SrO + BaO | 5-40 | 15 (BaO) | 23 (CaO) |
| ZnO | 20-40 | 20 | 29 |
| $SiO_2$ | 30-55 | 50 | 48 |
| $B_2O_3$ | 0-20 | 5 | |
| $Al_2O_3$ | 0-10 | 5 | |
| CoO | 0-10 | 5 | |

The teachings of Baudry et al. are limited to vitreous glasses, the preferred compositions of which do not crystallize when fired at 800°-900° C.

U.S. Pat. No. 4,853,349, Martin

The Martin patent is directed to two groups of glass-ceramic materials. The first group contains by weight 1-7.25% MgO, 22-40% CaO, 18-36% $Al_2O_3$ and 29-42% $SiO_2$. The second group contains by weight 2-13% ZnO, 22-37.5% CaO, 18-34% $Al_2O_3$ and 28-42% $SiO_2$. Such glass-ceramic materials are characterized by the fact that they are formed by crystallization before the onset of deformation (densification). They would therefore be unsuitable for use in thick film dielectrics.

Definitions

As used herein, the term "partially crystallizable glass" means an amorphous glass which upon firing at 800°-950° C. yields one or more crystalline phases dispersed in a matrix of remnant glass.

DETAILED DESCRIPTION OF THE INVENTION

The invention is directed to a dielectric glass composition in which ceramic oxide materials are used as fillers to optimize its stable dielectric performance in multilayer circuits. The material may be processed thermally at temperatures in the region of 850° C. in air or inert atmosphere. A printed layer of particulate solids of the dielectric materials when fired will flow and bond strongly to ceramic alumina substrates. The fused layer will strongly resist metal oxide flux penetration into the dielectric. The dielectric materials are formulated to optimize thick film conductor adhesion for both sequentially fired layers of conductor and dielectric or for cofired layers of dielectric or conductor-dielectric pairs.

The materials may also be used to formulate a tape dielectric using lamination as the means to make circuits. Subsequent layers of dielectric may be bonded separating base metal circuit patterns forming a multilayer circuit. This glass material crystallizes to a refractory ceramic-glass composite microstructure, which exhibits excellent stability as a ceramic dielectric in multilayer structures involving base metal conductor patterns and additional layers of the same dielectric material, thus forming three dimensional circuit patterns.

Many ceramic oxide filled glass dielectrics for precious metal and base metal inks have been used previously to form multilayer circuits when fired in air. However, base metal conductor inks, which fire in $N_2$ or air used with commercially available dielectric materials, are found to fail by shorting through the dielectric either during firing or during environmental exposure because of interactions which take place between the conductor and dielectric materials. The dielectrics are normally somewhat porous which permits penetration of conductive flux phases into the dielectric layers.

A glass that crystallizes during the firing process is desirable for a thick film dielectric because of its stability during refiring. The softening and densification of the glass must occur at a high enough temperature to allow complete burnout of the organic components of the thick film paste. If the glass densifies before complete burnout, then blistering of the dielectric will often occur due to carbonaceous particles trapped in the material.

To achieve stability on refiring, the crystallization should reach an end point during the first firing with no changes in subsequent refires. Generally 60-75 volume percent crystallization is desired with the remaining composition (remnant glass) forming an amorphous matrix around the crystallites. Crystallization must occur after the glass is completely densified. If premature crystallization occurs the glass will not densify. A temperature range of approximately 10° to 50° C. between the completion of densification and the onset of crystallization is desired.

In a typical thick film firing a maximum firing temperature of 850°-900° C. is held for about ten minutes with a total firing time of only 30-60 minutes. During this rapid firing a dielectric consisting of a crystallizable glass as described above must go through three processes of organic burnout, densification, and crystallization. To form an acceptable dielectric each process must occur quickly and be completed before the next process begins.

In addition to these densification and crystallization requirements the dielectric must have a thermal expansion match to the substrate used (usually alumina), satisfy several electrical requirements (low leakage current and dissipation factor, and high breakdown voltage and insulation resistance), and provide a surface that thick film conductors can adhere to. The material systems that satisfy all of these requirements are very limited, especially when firing at low temperatures, such as 850° C.

Formulating dielectrics with glasses with optimized compositions to resist extensive conductor flux penetration into the dielectric is essential for the manufacture of reliable multilayer circuits with base metal conductors. Dielectrics can be formulated with the glass compositions of the invention which are compatible with pure Ag, Au or Cu conductors or conductors formulated with mixtures or alloys such as Ag/Pd, Ag/Pt, Au/Pt, etc. in different proportions.

The dielectric composition of the invention are therefore directed to partially crystallizable glass compositions that satisfy the thick film dielectric requirements described hereinabove. These compositions are based on the calcium zinc silicate system. A range of compositions within this system have been identified, satisfying the densification, crystallization, and thermal expansion requirements.

Organic Medium

Organic media suitable for use in the invention are selected according to the physical form in which the glass compositions are applied. In particular, the glass frit can be applied as a thick film paste by screen printing and it can also be applied as a green tape.

When the dielectric is applied by screen printing, the particles thereof are mixed with an inert liquid medium (vehicle) by mechanical mixing (e.g., on a roll mill) to form a pastelike composition having suitable consistency and rheology for screen printing. The latter is printed as a "thick film" in the conventional manner.

The main purpose of the organic medium is to serve as a vehicle for dispersion of the finely divided solids of the composition in such form that it can readily be applied to ceramic or other substrates. Thus the organic medium must first of all be one in which the solids can be dispersed with an adequate degree of stability. Secondly, the rheological properties of the organic medium must be such that they lend good application properties to the dispersion.

Most thick film compositions are applied to a substrate by means of screen printing. Therefore, they must have appropriate viscosity so that they can be passed through the screen readily. In addition, they should be thixotropic in order that they set up rapidly after being screened, thereby giving good pattern resolution. While the rheological properties are of primary importance, the organic medium is preferably formulated also to give appropriate wettability of the solids and the substrate, good drying rate, dried film strength sufficient to withstand rough handling, and good firing properties. Satisfactory apperance of the fired film is also important.

In view of all these criteria, a wide variety of liquids can be used as organic medium. The organic medium for most thick film compositions is typically a solution of resin in a solvent frequently also containing thixotropic agents and wetting agents. The solvents usually boil within the range of 130°-350° C.

Suitable solvents include kerosene, mineral spirits, dibutylphthalate, butyl Carbitol, butyl Carbitol acetate, hexylene glycol and high boiling alcohols and alcohol esters. Various combinations of these and other solvents are formulated to obtain the desired viscosity and volatility.

By far the most frequently used and a frequently preferred resin for this purpose is ethyl cellulose. However, resins such as ethylhydroxyethyl cellulose, wood rosin, mixtures of ethyl cellulose and phenolic resins, polymethacrylates of lower alcohols and monobutyl ether of ethylene glycol monoacetate can also be used.

In the past, poly(alpha-methyl styrene) has been utilized as a resin for thick film applications because of its excellent burn-out properties. However, poly(alpha-methyl styrene) has not been widely used because thick film pastes made therewith have exhibited very poor rheological properties. It has, however, been found that when the compositions of the invention are formulated as thick film pastes using poly(alpha-methyl styrene) dissolved in dibutyl Carbitol, the resulting paste has quite good rheological properties for screen printing. Thus, a preferred organic medium for formulating the compositions of the invention as a thick film paste is a solution of 20–60% wt. poly(alpha-methyl styrene) and 80–40% wt. dibutyl Carbitol and preferably 45–55% wt. poly(alpha-methyl styrene) and 55–45% wt. dibutyl Carbitol.

Among the thixotropic agents which are commonly used are hydrogenated castor oil and derivatives thereof and ethyl cellulose. It is, of course, not always necessary to incorporate a thixotropic agent since the solvent resin properties coupled with the shear thinning inherent in any suspension may alone by suitable in this regard. Suitable wetting agents include phosphate esters and soya lecithin.

The ratio of organic medium to solids in the paste disperions can vary considerably and depends upon the manner in which the dispersion is to be applied and the kind of organic medium used. Normally, to achieve good coverage, the dispersions will contain complementally by weight 40–90% solids and 60–10% organic medium.

The glass compositions of the invention can also be easily used for the manufacture of green tape by the conventional method. This involves slip casting a slurry of the glass particles dispersed in a solution of binder polymer, plasticizer and volatile solvent onto a flexible carrier such as polypropylene or Mylar® polyester film or stainless steel, adjusting the thickness of the cast film by passing the cast slurry under a doctor blade and then heating the doctored slurry to remove the volatile solvent from the layer by evaporation. The tape consisting of solids dispersed in a matrix of polymeric binder is removed from the carrier and slit to appropriate widths for use in making multilayer structures. Green tapes of this kind generally have a thickness of 3 to 15 mils.

A wide variety of polymeric materials can be used as the binder for green tape such as poly (vinyl butyral), poly (vinyl acetate), poly (vinyl alcohol), cellulosic polymers such as methyl cellulose, ethyl cellulose, hydroxyethyl cellulose, methylhydroxyethyl cellulose, atactic polypropylene, polyethylene, silicon polymers such as poly (methyl siloxane), poly (methylphenyl siloxane), polystyrene, butadiene/styrene copolymer, polystyrene, poly (vinyl pyrrolidone), polyamides, high molecular weight polyethers, copolymers of ethylene oxide and propylene oxide, polyacrylamides, and various acrylic polymers such as sodium polyacrylate, poly (lower alkyl acrylates), poly (lower alkyl methacrylates) and various copolymers and multipolymers of lower alkyl acrylates and methacrylates. Copolymers of ethyl methacrylate and methyl acrylate and terpolymers of ethyl acrylate, methyl methacrylate and methacrylic acid.

A preferred class of polymeric binders for making green tapes for the composition of the invention are those disclosed by Usala in U.S. Pat. No. 4,613,648. These polymeric binders are a mixture of compatible multipolymers of 0–100% wt. $C_{1-8}$ alkyl methacrylate, 100–0% wt. $C_{1-8}$ alkyl acrylate, and 0–5% wt. ethylenically unsaturated carboxylic acid or amine, the multipolymer being further characterized as having a number average molecular weight ($M_n$) of 50,000 to 100,000, a weight average molecular weight ($M_w$) of 150,000 to 350,000, the ratio of $M_w$ to $M_n$ being no greater than 5.5, the total amount of unsaturated carboxylic acid or amine in the multipolymer mixture is 0.2–2.0% wt., and the glass transition temperature of the polymer and plasticizer therein, if any, is −30° to +45° C.

The organic medium in which the ceramic solids are dispersed contains principally the polymeric binder dissolved in organic solvent. However, the medium may contain other dissolved materials such as plasticizers, release agents, dispersing agents, thixotropic agents, stripping agents, antifouling agents and wetting agents.

For casting solutions, the solvent component of the organic medium is chosen so as to obtain complete solution therein of the polymer and sufficiently high volatility to enable the solvent to be evaporated from the dispersion by the application of relatively low levels of heat at atmospheric pressure. In addition, the solvent must boil well below the boiling point and decomposition temperature of any other additives contained in the organic medium. Thus, solvents having atmospheric boiling points below 150° C. are used most frequently. Such solvents include benzene, acetone, xylene, methanol, ethanol, methylethyl ketone, 1,1,1-trichloroethane, tetrachloroethylene, amyl acetate, 2,2,4-triethylpentanediol-1,3mono isobutyrate, toluene, methylene chloride, 2-propanol and Freon ® TF (trichlorotrifluoroethane).

Glass Melting Procedure

The glasses of the examples were synthesized by weighing raw material constituents which include using the carbonates or the oxides of alkaline earth modifiers such as BaO, CaO, SrO or MgO. ZnO, $SiO_2$ and $Al_2O_3$ were used as oxides. Zircon, $ZrSiO_4$, was used as a source of $ZrO_2$ and $SiO_2$. $AlPO_4$ or $AlP_3O_9$ was used as a source of $P_2O_5$ and $Al_2O_3$. In some cases, calcium phosphate was used as a source of $P_2O_5$ and CaO. After weighing, the oxides are mixed by tumbling or ball milling. They are then melted at 1400°–1500° C. for less than 1.5 hours in air in platinum containers. The melts are quenched on dry counter rotating ferrous metal rollers having a 0.010" gap between them to form thin wafer glass ribbon. The cooled ribbon glass is then ground to a coarse powder. The coarse powders are further milled to obtain a 3–5 micron mean particle diameter. The powders are then mixed with organic media to prepare thick film ink or green tape.

Test Procedures

Capacitance: Capacitance is a measure of the capability of a material to store an electric charge. Expressed mathematically, $$C = E_o K A / t$$

where A equals area overlap of the conductors, t is thickness of the dielectric layer and K is dielectric constant and $E_o$ is the permittivity of free space. The units of capacitance are farads.

Dissipation Factor: Dissipation Factor (DF) is a measure of the phase difference between voltage and current. In a perfect capacitor, the phase difference would be 90°. However, in practical dielectric systems, DF is less than 90° because of leakage and relaxation losses. In particular, DF is the tangent of the angle by which the current lags the 90° vector.

Insulation Resistance: Insulation resistance (IR) is a measure of the ability of a charge capacitor to withstand leakage in DC current. Insulation resistance is a constant for any given dielectric regardless of capacitance.

Breakdown Voltage: The Breakdown Voltage test (also called the dielectric-strength test) consists of the application of a voltage higher than rated voltage for a specific time between mutually insulated portions of a component part or between insulated portions and ground. The voltage is raised until the component part fails which is indicated by short circuiting. This is used to observe whether the component part can operate safely at its rated voltage and withstand momentary over potentials due to switching, surges, and other similar phenomena. Although this test is often called a voltage breakdown or dielectric-strength test, it is not intended that this test cause insulation breakdown or that it be used for detecting corona. Rather it serves to determine whether the insulating properties of materials and spacings in the component part are adequate. When a component part is faulty in these respects, application of the test voltage will result in either disruptive discharge or deterioration. Disruptive discharge is evidenced by flashover (surface discharge), sparkover (air discharge), or breakdown (puncture discharge). Deterioration due to excessive leakage currents may change electrical parameters or physical characteristics. Dielectric breakdown is reported in volts/mil or volts/cm of dielectric thickness. Dielectric layers are designed to have sufficient thickness to provide a margin of safety well below the breakdown of the dielectric. The test is conducted in accordance with MIL-STD-202E, Apr. 16, 1973.

Leakage Current: The Leakage Current test is a measure of the level of hermeticity of a fired dielectric film as measured by a D.C. voltage-driven electrolytic current when the dielectric is immersed in a saline solution.

Test speciments are prepared by printing a thick film conducting pattern on ten 2"×2" $Al_2O_3$ substrates. The conductor patterns are oven dried at 110°–120° C. and then fired at 850° C. Two layers of patterned dielectric materials are then applied sequentially on top of the fired conductor. Each of the layers is oven-dried at 150° C. and fired at 850° C. Thickness of the combined dielectric layers is 30–50 μm.

These test prints are placed in a prewired connector and positioned in a 1.0N NaCl solution so that the test print is completely immersed. Using a platinum anode, 10 volts are applied between the conductor assembly and anode and the current for each of 10 test samples is measured after 5 mins. under voltage. A leakage current of 1 μA/$cm^2$ or less is considered satisfactory for most circuit requirements.

EXAMPLES

Examples 1–131

A number of glass compositions in accordance with the invention were made by the glass melting procedure described above for the purpose of demonstrating the wide tolerance of the particular range of CaO-ZnO-$SiO_2$ glasses for modifying additives such as BaO, SrO, $ZrO_2$, $Al_2O_3$, $P_2O_5$, $TiO_2$, MgO, $HfO_2$ and the like. The composition, TCE, and crystallization properties of the glasses are given in Table 1 below:

TABLE 1

| Glass Composition Examples | | | | | | | | | | | | | |
|---|---|---|---|---|---|---|---|---|---|---|---|---|---|
| | Mole % | | | | | | | | | | Softening Temp. (C.) | 1st Crsyt. Temp. (C.) | 2nd Crsyt. Temp. (C.) | TCE $10^{-7}$/C. |
| Ex. | $SiO_2$ | CaO | ZnO | BaO | $ZrO_2$ | $Al_2O_3$ | $P_2O_5$ | SrO | MgO | $TiO_2$ | | | | |
| 1 | 41.71 | 25.87 | 32.42 | | | | | | | | 746 | 816 | 859 | 67.2 |
| 2 | 42.00 | 29.00 | 29.00 | | | | | | | | 739 | 833 | | 79.2 |
| 3 | 45.09 | 28.76 | 26.16 | | | | | | | | 753 | 887 | | 73.3 |
| 4 | 51.51 | 22.40 | 26.10 | | | | | | | | 770 | 873 | | 60.5 |
| 5 | 45.09 | 26.76 | 24.16 | 4.00 | | | | | | | 758 | 891 | | 89.4 |

TABLE 1-continued

Glass Composition Examples

| Ex. | SiO2 | CaO | ZnO | BaO | ZrO2 | Al2O3 | P2O5 | SrO | MgO | TiO2 | Softening Temp. (C.) | 1st Crsyt. Temp. (C.) | 2nd Crsyt. Temp. (C.) | TCE 10-7/C. |
|---|---|---|---|---|---|---|---|---|---|---|---|---|---|---|
| 6 | 42.72 | 23.29 | 32.59 | | 1.40 | | | | | | 746 | 831 | 882 | 69.1 |
| 7 | 41.09 | 28.37 | 28.38 | | 2.15 | | | | | | 749 | 855 | | 78.5 |
| 8 | 44.13 | 28.14 | 25.60 | | 2.13 | | | | | | 767 | 893 | | 78.5 |
| 9 | 40.49 | 25.85 | 31.00 | 1.77 | 0.88 | | | | | | 761 | 826 | 873 | 82.1 |
| 10 | 40.93 | 18.54 | 36.34 | 2.80 | 1.39 | | | | | | 715 | 793 | 848 | 70.3 |
| 11 | 41.54 | 22.64 | 31.69 | 2.75 | 1.37 | | | | | | 749 | 838 | | |
| 12 | 42.13 | 26.60 | 27.22 | 2.71 | 1.34 | | | | | | 759 | 857 | | |
| 13 | 43.76 | 20.73 | 29.02 | 4.33 | 2.15 | | | | | | 758 | 896 | | |
| 14 | 40.59 | 22.13 | 30.96 | 2.69 | 3.63 | | | | | | 761 | 874 | | |
| 15 | 43.93 | 28.02 | 25.48 | | | 2.57 | | | | | 766 | 850 | 893 | 85.9 |
| 16 | 34.87 | 21.86 | 40.11 | | | 3.16 | | | | | | 765 | 798 | |
| 17 | 41.60 | 23.82 | 25.99 | | | 8.59 | | | | | 803 | 902 | 936 | 60.3 |
| 18 | 42.04 | | 31.85 | 13.05 | | 13.05 | | | | | 812 | 862 | 909 | 66.2 |
| 19 | 39.65 | 18.55 | 32.12 | 4.84 | | 4.84 | | | | | 761 | 833 | 854 | 72 |
| 20 | 40.78 | 16.72 | 28.53 | 6.99 | | 6.98 | | | | | 772 | 884 | | 68.9 |
| 21 | 39.43 | 22.03 | 31.85 | 2.68 | 1.33 | 2.68 | | | | | 747 | 824 | 847 | 79.5 |
| 22 | 40.43 | 22.03 | 30.85 | 2.67 | 1.33 | 2.68 | | | | | 759 | 848 | 867 | 80.3 |
| 23 | 44.29 | 16.83 | 26.85 | 6.95 | 1.86 | 3.21 | | | | | 784 | 870 | 939 | 76.7 |
| 24 | 37.43 | 22.03 | 31.84 | 2.68 | 2.33 | 3.68 | | | | | 753 | 832 | 865 | 72.5 |
| 25 | 38.43 | 22.03 | 31.86 | 2.68 | 1.33 | 3.68 | | | | | 749 | 826 | 856 | 73.2 |
| 26 | 39.18 | 22.03 | 31.85 | 2.68 | 0.58 | 3.68 | | | | | 765 | 825 | 849 | 69.5 |
| 27 | 37.38 | 17.37 | 36.46 | 2.69 | 1.34 | 4.76 | | | | | 751 | 813 | 874 | 60.4 |
| 28 | 44.04 | 19.88 | 25.80 | 2.62 | 1.30 | 6.35 | | | | | 798 | 884 | 940 | 67.3 |
| 29 | 39.19 | 19.23 | 24.50 | 9.21 | 1.33 | 6.54 | | | | | 789 | 912 | 945 | 85.6 |
| 30 | 41.46 | 10.15 | 27.29 | 11.77 | 2.42 | 6.90 | | | | | 789 | 882 | 910 | 78.8 |
| 31 | 39.18 | 21.34 | 20.53 | 10.22 | 1.48 | 7.26 | | | | | 798 | 895 | | 86 |
| 32 | 44.13 | 21.72 | 22.77 | 1.73 | 0.86 | 8.80 | | | | | 809 | 900 | 915 | 58.9 |
| 33 | 41.79 | 28.85 | 28.85 | | | | 0.50 | | | | 755 | 834 | 868 | 76.3 |
| 34 | 41.58 | 28.71 | 28.71 | | | | 1.00 | | | | 752 | 835 | 874 | 80.1 |
| 35 | 41.00 | 29.00 | 29.00 | | | 0.50 | 0.50 | | | | 762 | 809 | 846 | 82.5 |
| 36 | 41.22 | 28.47 | 28.47 | | | 0.92 | 0.92 | | | | 749 | 846 | 875 | 80.8 |
| 37 | 41.30 | 22.52 | 31.51 | 2.74 | | 0.96 | 0.97 | | | | 743 | 822 | 847 | 77.6 |
| 38 | 41.44 | 22.59 | 31.61 | 2.75 | 1.36 | | 0.24 | | | | 736 | 850 | | 80.9 |
| 39 | 41.34 | 22.53 | 31.54 | 2.74 | 1.36 | | 0.49 | | | | 750 | 857 | | 81.9 |
| 40 | 41.13 | 22.42 | 31.38 | 2.73 | 1.35 | | 0.99 | | | | 755 | 846 | 871 | 81.2 |
| 41 | 39.99 | 29.00 | 29.00 | | | 1.00 | 0.50 | 0.50 | | | 763 | 830 | 844 | 83.8 |
| 42 | 38.00 | 29.00 | 29.00 | | | 3.00 | 0.50 | 0.50 | | | 759 | 817 | 857 | 77.1 |
| 43 | 39.19 | 28.42 | 28.41 | | | 3.00 | 0.49 | 0.49 | | | 762 | 825 | 864 | 76.8 |
| 44 | 37.21 | 28.41 | 28.40 | | | 4.99 | 0.49 | 0.49 | | | 758 | 833 | 870 | 80.9 |
| 45 | 40.30 | 27.83 | 27.84 | | | 2.16 | 0.94 | 0.94 | | | 759 | 842 | 890 | 81.9 |
| 46 | 39.51 | 27.29 | 27.29 | | | 2.16 | 1.87 | 1.88 | | | 759 | 880 | 918 | 76.4 |
| 47 | 41.34 | 22.53 | 31.54 | 2.74 | 1.36 | | 0.25 | 0.24 | | | 744 | 846 | | 82.8 |
| 48 | 40.68 | 18.42 | 36.11 | 1.97 | 1.83 | | 0.49 | 0.49 | | | 745 | 810 | 871 | 72.2 |
| 49 | 41.13 | 22.43 | 31.38 | 2.73 | 1.36 | | 0.49 | 0.49 | | | 741 | 859 | | 80.5 |
| 50 | 41.13 | 22.43 | 31.38 | 2.73 | 1.36 | | 0.24 | 0.73 | | | 760 | 876 | 920 | 75 |
| 51 | 39.79 | 21.68 | 30.35 | 2.64 | 3.55 | | 0.99 | 0.99 | | | 757 | 869 | 961 | 72.8 |
| 52 | 39.85 | 21.10 | 33.00 | 2.72 | 1.35 | | 0.99 | 0.98 | | | 747 | 831 | 865 | 81.1 |
| 53 | 40.73 | 22.20 | 31.08 | 2.70 | 1.34 | | 0.97 | 0.98 | | | 743 | 855 | 890 | 79.5 |
| 54 | 42.89 | 20.32 | 28.44 | 4.25 | 2.11 | | 1.00 | 1.00 | | | 763 | 902 | 946 | 83.7 |
| 55 | 40.00 | | 40.00 | | | | | | 20.00 | | 733 | 790 | 880 | 60.5 |
| 56 | 40.00 | | 32.00 | | 2.00 | | | | 26.00 | | 700 | 792 | 836 | 79.3 |
| 57 | 42.12 | | 31.52 | | | 13.18 | | | 13.18 | | 806 | 872 | | 36.3 |
| 58 | 40.40 | | 33.80 | 11.90 | | 4.50 | | | 9.40 | | | 817 | 931 | 52 |
| 59 | 41.67 | | 27.12 | 14.82 | 2.84 | | | | 13.56 | | 782 | 837 | 900 | |
| 60 | 40.50 | | 30.80 | 10.80 | 2.50 | | | | 15.40 | | 759 | 807 | 844 | 70.9 |
| 61 | 44.80 | | 29.40 | 5.10 | 2.50 | | | | 18.30 | | 760 | 879 | 898 | 74.5 |
| 62 | 42.44 | | 36.08 | 0.91 | 1.52 | | | | 19.05 | | 754 | 847 | | 59.9 |
| 63 | 40.50 | | 31.60 | 4.20 | 2.00 | | | | 21.70 | | | 795 | 852 | 69.2 |
| 64 | 41.53 | | 33.13 | | 1.53 | 4.81 | | | 19.00 | | 771 | 855 | 985 | |
| 65 | 40.90 | | 26.00 | 15.00 | 2.10 | 4.70 | | | 11.40 | | 811 | 860 | 881 | 88.9 |
| 66 | 41.90 | | 31.30 | 7.60 | 1.70 | 2.20 | | | 15.40 | | 790 | 848 | 1006 | 62.7 |
| 67 | 40.80 | | 25.90 | 14.10 | 2.10 | 5.25 | 0.55 | | 11.30 | | 806 | 860 | 893 | 91.4 |
| 68 | 40.62 | | 27.28 | 14.61 | 2.85 | 0.50 | 0.50 | | 13.64 | | 837 | 901 | 1006 | |
| 69 | 39.30 | | 29.10 | 9.30 | 2.10 | 4.00 | 0.60 | | 15.70 | | 783 | 834 | 874 | 86.5 |
| 70 | 40.00 | | 32.00 | 3.00 | 2.00 | 0.50 | 0.50 | 22.00 | | | 700 | 808 | 844 | 73.5 |
| 71 | 39.50 | | 29.50 | 9.30 | 2.10 | 2.87 | 0.60 | | 16.20 | | 771 | 824 | 878 | 87.3 |
| 72 | 43.38 | 20.88 | 30.65 | | 1.33 | | | | 3.75 | | 745 | 873 | 912 | 73.9 |
| 73 | 44.80 | 5.10 | 29.40 | | 2.50 | | | | 18.30 | | 774 | 899 | | 62.5 |
| 74 | 39.95 | 18.01 | 31.19 | | | 5.42 | | | 5.42 | | 755 | 832 | 899 | 62.5 |
| 75 | 41.15 | 16.04 | 27.37 | | | 7.72 | | | 7.72 | | 786 | | 909 | 60.8 |
| 76 | 40.31 | 22.85 | 31.05 | 3.09 | 0.80 | | | | 1.90 | | 754 | 834 | 867 | 83.9 |
| 77 | 41.54 | 18.64 | 31.70 | 2.75 | 1.37 | | | | 4.00 | | 748 | 843 | | |
| 78 | 41.54 | 22.64 | 27.70 | 2.75 | 1.37 | | | | 4.00 | | 756 | 850 | 874 | 79.9 |
| 79 | 43.06 | 11.59 | 33.42 | 0.92 | 1.42 | | | | 9.60 | | 756 | 861 | 892 | 73.7 |
| 80 | 41.28 | 22.49 | 27.53 | 2.73 | | 2.00 | | | 3.97 | | 741 | 820 | 877 | 82.9 |
| 81 | 41.90 | 10.70 | 34.80 | | 0.60 | 1.40 | | | 10.70 | | 742 | 830 | 896 | 72.1 |
| 82 | 36.61 | 22.62 | 27.61 | 2.75 | 2.36 | 4.03 | | | 4.02 | | 774 | 852 | 929 | |

TABLE 1-continued

Glass Composition Examples

| | Mole % | | | | | | | | | Softening Temp. (C.) | 1st Crsyt. Temp. (C.) | 2nd Crsyt. Temp. (C.) | TCE 10-7/C. |
|---|---|---|---|---|---|---|---|---|---|---|---|---|---|
| Ex. | SiO2 | CaO | ZnO | BaO | ZrO2 | Al2O3 | P2O5 | SrO | MgO | TiO2 | | | | |
| 83 | 36.98 | 22.85 | 27.89 | 2.78 | 1.38 | 4.07 | | 4.06 | | | 787 | 849 | 925 | |
| 84 | 40.71 | 22.18 | 27.15 | 2.70 | 1.34 | 2.00 | | 3.92 | | | 772 | 851 | 888 | 83.6 |
| 85 | 40.00 | 15.10 | 29.60 | 6.20 | 1.50 | 1.50 | | 6.20 | | | 753 | 839 | 878 | 72.2 |
| 86 | 40.60 | 7.30 | 33.70 | 7.30 | 2.30 | 1.60 | | 7.30 | | | 781 | 838 | | 63 |
| 87 | 40.27 | 7.14 | 20.28 | 10.07 | 2.17 | 10.00 | | 10.07 | | | 824 | 899 | | 85.4 |
| 88 | 36.61 | 19.97 | 33.01 | | 1.37 | 4.53 | 0.49 | 4.03 | | | 762 | 830 | 899 | 71.3 |
| 89 | 40.00 | 22.48 | 30.43 | 2.73 | 1.36 | 1.50 | 0.49 | 1.01 | | | 745 | 834 | 861 | 77.9 |
| 90 | 39.65 | 22.70 | 31.79 | 1.00 | 1.37 | 1.99 | 0.49 | 1.00 | | | 756 | 811 | 860 | 72.8 |
| 91 | 38.87 | 22.53 | 29.49 | 2.74 | 1.36 | 2.51 | 0.49 | 2.01 | | | 754 | 851 | 882 | 80.9 |
| 92 | 38.19 | 22.55 | 28.93 | 2.74 | 1.37 | 3.11 | 0.49 | 2.61 | | | 761 | 861 | 923 | 80 |
| 93 | 37.52 | 22.58 | 28.36 | 2.75 | 1.37 | 3.71 | 0.49 | 3.22 | | | 760 | 874 | 942 | 81.6 |
| 94 | 41.14 | 18.43 | 31.38 | 2.72 | 1.36 | 0.49 | 0.49 | 4.00 | | | 749 | 858 | 901 | |
| 95 | 41.13 | 22.43 | 27.38 | 2.73 | 1.36 | 0.49 | 0.49 | 3.99 | | | 744 | 858 | 891 | 82.4 |
| 96 | 40.31 | 21.98 | 26.83 | 2.67 | 1.33 | 2.47 | 0.48 | 3.91 | | | 771 | 867 | 922 | 82.4 |
| 97 | 38.59 | 22.62 | 27.61 | 2.75 | 1.37 | 2.55 | 0.49 | 4.03 | | | 771 | 843 | 913 | 85 |
| 98 | 36.61 | 18.59 | 31.65 | 2.75 | 1.37 | 4.52 | 0.49 | 4.03 | | | 763 | 849 | 925 | 72.8 |
| 99 | 36.61 | 22.62 | 27.61 | 2.75 | 1.37 | 4.52 | 0.49 | 4.02 | | | 777 | 856 | 899 | 79.2 |
| 100 | 45.09 | 26.76 | 24.16 | | | | | 3.99 | | | 761 | 884 | | 79.8 |
| 101 | 41.48 | 19.18 | 29.76 | | | | | 9.59 | | | 736 | 807 | 864 | 60.0 |
| 102 | 50.40 | 21.42 | 17.47 | | | | | 10.71 | | | 783 | 880 | | 82.3 |
| 103 | 45.09 | 26.75 | 24.16 | 2.00 | | | | 2.00 | | | 761 | 874 | 891 | 79 |
| 104 | 41.48 | 2.54 | 31.90 | 8.03 | | | | 16.06 | | | 745 | 803 | 915 | 71.5 |
| 105 | 41.65 | 22.81 | 30.26 | | 1.20 | | | 4.08 | | | 740 | 834 | 860 | 68.6 |
| 106 | 45.26 | 22.46 | 25.16 | | 1.46 | | | 5.65 | | | 763 | 889 | 928 | 81.1 |
| 107 | 42.30 | 23.23 | 25.29 | | 2.96 | | | 6.21 | | | 767 | 863 | 904 | 69.7 |
| 108 | 44.64 | 22.88 | 24.91 | | 1.46 | | | 6.12 | | | 757 | 876 | 906 | 80.9 |
| 109 | 41.83 | 18.86 | 28.84 | | 1.04 | | | 9.42 | | | 743 | 816 | 864 | 66.1 |
| 110 | 43.46 | 20.96 | 22.79 | | 2.32 | | | 10.48 | | | 766 | 874 | 895 | 86.3 |
| 111 | 49.41 | 21.68 | 16.57 | | 1.50 | | | 10.84 | | | 795 | 897 | | 85.8 |
| 112 | 41.90 | 17.08 | 29.57 | | | 5.72 | | 5.72 | | | 758 | 854 | 930 | |
| 113 | 40.10 | 15.71 | 36.24 | 2.58 | 1.28 | | | 4.09 | | | 738 | 798 | 855 | 63.6 |
| 114 | 39.80 | 14.13 | 35.19 | 2.55 | 1.27 | | | 7.07 | | | 737 | 797 | 861 | 68.5 |
| 115 | 41.16 | 8.40 | 32.12 | 6.40 | 1.67 | | | 10.26 | | | 747 | 822 | | 69.9 |
| 116 | 45.70 | 12.70 | 25.26 | 2.43 | 1.21 | | | 12.70 | | | 772 | 873 | 910 | 82.1 |
| 117 | 44.95 | 22.61 | 24.61 | | | 0.90 | 0.89 | 6.05 | | | 763 | 895 | 960 | 79.18 |
| 118 | 46.42 | 22.55 | 24.54 | | | 0.22 | 0.22 | 6.03 | | | 760 | 868 | 890 | 85.5 |
| 119 | 41.52 | 18.71 | 28.62 | | | 0.90 | 0.90 | 9.36 | | | 745 | 828 | 901 | 74.9 |
| 120 | 47.22 | | 21.47 | 11.37 | 1.18 | 3.98 | | 14.78 | | | 799 | 903 | | 88.7 |
| 121 | 44.28 | 22.50 | 25.20 | | 1.46 | 0.45 | 0.45 | 5.65 | | | 760 | 987 | | 80 |
| 122 | 43.27 | 22.65 | 25.37 | | 2.11 | 0.46 | 0.46 | 5.69 | | | 764 | 864 | 911 | 75.8 |
| 123 | 40.32 | 25.01 | 31.34 | | | | | | | 3.32 | 733 | 815 | 852 | 73.6 |
| 124 | 49.02 | 21.50 | 16.44 | | | | | 10.75 | 2.29 | | 791 | 883 | | 80.4 |
| 125 | 39.99 | 2.44 | 30.76 | 7.74 | | | | 15.49 | 3.58 | | 759 | 803 | 885 | 70.9 |
| 126 | 42.99 | 20.36 | 28.51 | 4.26 | 2.11 | | | | 1.78 | | 760 | 894 | | 87.2 |
| 127 | 40.09 | 21.86 | 30.58 | 2.66 | 1.32 | | | | 3.49 | | 747 | 850 | 871 | 83.3 |
| 128 | 40.00 | 29.00 | 29.00 | | | 0.50 | 0.50 | | 1.00 | | 755 | 827 | 840 | 77.6 |
| 129 | 38.79 | 28.12 | 28.12 | | | 0.48 | 0.49 | | 4.00 | | 747 | 851 | | 78.6 |
| 130 | 39.06 | 21.30 | 29.80 | 2.59 | 3.49 | 0.99 | 1.00 | | 1.77 | | 762 | 868 | 966 | 70.7 |
| 131 | 42.12 | 19.94 | 27.93 | 4.17 | 2.07 | 1.00 | 1.00 | | 1.78 | | 768 | 905 | 933 | 76.3 |

The softening and crystallization temperatures of each glass were determined by DTA. The linear thermal coefficient of expansion (TCE) was measured from 22°-850° C. In the DTA runs, the temperature at which a large endothermic shift occurred prior to crystallization was taken as the softening temperature. This endothermic shift coincides with densification of the glass powder in the sample holder. The crystallization temperatures listed in Table 1 were taken at the maximum of the first and second exothermic peaks. For many of the compositions the first exothermic peak is associated with the crystallization of more than one crystal phase. The crystalline phases were identified by X-ray diffraction. DTA traces of some of the compositions exhibited additional exothermic crystallization peaks at higher temperatures.

The Calcium Zinc Silicate System

The calcium zinc silicate ($CaO\text{-}ZnO\text{-}SiO_2$) phase diagram is shown in FIG. 1. Hardystonite ($Ca_2ZnSi_2O_7$) is the only stable calcium zinc silicate crystal phase in this system. Hardystonite has a larger thermal expansion compared to alumina. Willemite ($Zn_2SiO_4$) is a zinc silicate crystal that forms a stable phase field adjacent to the hardystonite phase field. Willemite has a lower thermal expansion than alumina. Glass compositions near the hardystonite-willemite phase boundary will crystallize these two phases when heated to around 750°-950° C. By balancing the ratios of these two phases through compositional modifications of the glass, the thermal expansion of the crystallized glass can be matched to alumina.

A large area of compositions within this system will form glass. Within this glass-forming region, a small region of compositions in the calcium zinc silicate system satisfies the densification, crystallization, and thermal expansion requirements of a crystallizable glass for an 850° or 900° C. firing thick film dielectric. This region falls in the hardystonite phase filed near the hardystonite-willemite boundary, as shown in FIG. 1 by the area within the lines connecting compositions a, b, c, d, e, and f. The compositions of these points are listed in Table 2. The area within the area defined by points b through e forms the preferred region for an 850° C. firing dielectric, while the compositions within the area defined by points a, b, e and f are preferred for a 900° C. firing.

TABLE 2

Calcium Zinc Silicate System
Boundaries for 800-950° C. Firing Dielectrics

| Component Point | CaO | ZnO % Wt. | SiO$_2$ |
|---|---|---|---|
| a | 22.5 | 31.5 | 46.3 |
| b | 22.8 | 35.6 | 41.6 |
| c | 23.0 | 39.2 | 37.8 |
| d | 26.6 | 37.5 | 35.9 |
| e | 27.3 | 33.8 | 38.9 |
| f | 28.0 | 30.5 | 41.5 |

Figure 2:
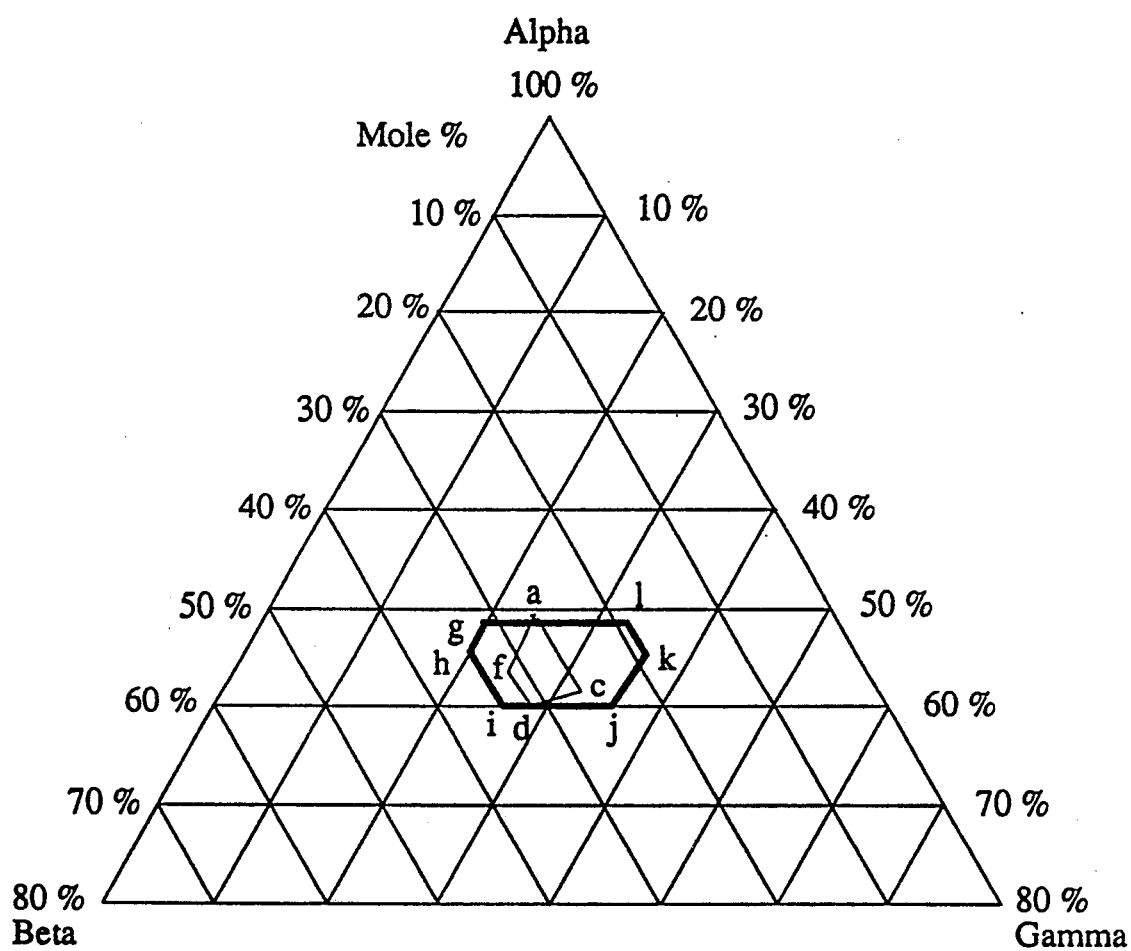
FIG. 2 is a ternary phase diagram showing the preferred compositional range for the system containing CaO, MgO and/or SrO as alkaline earth modifiers.

Compositions a, b, c, d, e, and f were determined from extrapolation of densification, crystallization, and thermal expansion data from Examples 1-4 in Table 1 (also labeled 1-4 in FIG. 2). The line labeled a-b-c represents compositions with a TCE of $70 \times 10^{-7}/°C.$, and line f-e-d represents compositions with a TCE of $85 \times 10^{-7}/°C$. Thus compositions between these lines have expansions close to alumina, and could be used as thick film dielectrics. However, an ideal dielectric should have a TCE between $78-80 \times 10^{-7}$ °C. This expansion range is slightly lower than alumina which causes the dielectric to be in compression, which strengthens the dielectric. In addition, the effect of high expansion metal layers will be counteracted by the dielectric having an expansion lower than alumina. A narrow band of compositions between the a-b-c and f-e-d lines have TCEs of $78-80 \times 10^{-7}/°C$. Example 2 falls into this narrow band with a TCE of $79.2 \times 10^{-7}/°C$.

The crystallization of the dielectric must be completed in one firing to maintain stability on refiring. Within the a-c-d-f region hardystonite and a zinc silicate crystallize at the a-c-d-f region hardystonite and a zinc silicate crystallize at 850° C. Depending on the composition, willemite or metastable zinc silicate or polymorphs of willemite phase boundary crystallize. In general, compositions closer to willemite crystallize willemite. Example 1 crystallizes willemite and hardystonite at 850° C., while Example 2 crystallizes another form of zinc silicate along with hardystonite. However, by heating this composition to 925° C. the zinc silicate transforms to willemite.

The crystallization temperature depends on composition of the glass and is in general controlled by the SiO$_2$/ZnO and CaO/ZnO ratios. As either of these ratios is increased the crystallization temperatures increase. Thus a high ZnO content is necessary to lower the crystallization temperatures. However, a high ZnO content also causes the willemite and hardystonite DTA crystallization peaks to separate, resulting in crystallization occurring over a wider temperature range, which is not desirable for a thick film dielectric (This occurs with Example 1 with a high ZnO content, but not with Examples 2-4 with lower ZnO contents.) Thus the ZnO content is important in controlling both the crystallization temperature and temperature range of crystallization. Other additives (BaO and ZrO$_2$) can be used to reduce the separation in the crystallization of the two phases, as described in the next section.

Line a-f represents compositions with a DTA crystallization peak temperature of 910° C. These DTA data were collected with a 10° C./minute heating rate. In an isothermal hold at 900° C. for 10 minutes complete crystallization would occur. Thus compositions on the ZnO side of this line will completely crystallize in a 900° C. firing. As described above "complete crystallization" refers to crystallization to an end point in the first firing, so that additional crystallization does not occur on repeat firings. A remnant glass still remains, generally at least 25% of the composition, which is too refractory to further crystallize at the firing temperature.

Line b-e represents compositions with a DTA crystallization peak temperature of 860° C. Compositions on the ZnO side of this line will completely crystallize in an 850° C. firing. Line c-d provides the remaining border for the preferred compositional region for an 850° C. firing. Compositions on the ZnO side of this line have too high a level of ZnO and thus will soften at too low a temperature, resulting in blistering of circuits during firing at 850° C.

The SiO$_2$/ZnO and SiO$_2$/CaO ratios control the temperature range of densification. The onset of densification (also referred to as softening point) decreases as these ratios are also decreased, with the SiO$_2$/ZnO ratio having a greater effect compared to the SiO$_2$/CaO ratio. The temperature range between densification and crystallization depends mainly on the CaO/ZnO ratio. Increasing this ratio widens the temperature range between densification and crystallization, which helps to insure complete densification, and the extra glass flow before crystallization helps to provide a smooth fired surface. If the temperature range is too narrow, crystallization will prevent complete densification from occurring. If the temperature range is too wide, then complete crystallization will not occur during the rapid thick film firing and there will be excess glass flow which will result in circuit blistering.

Figure 3:
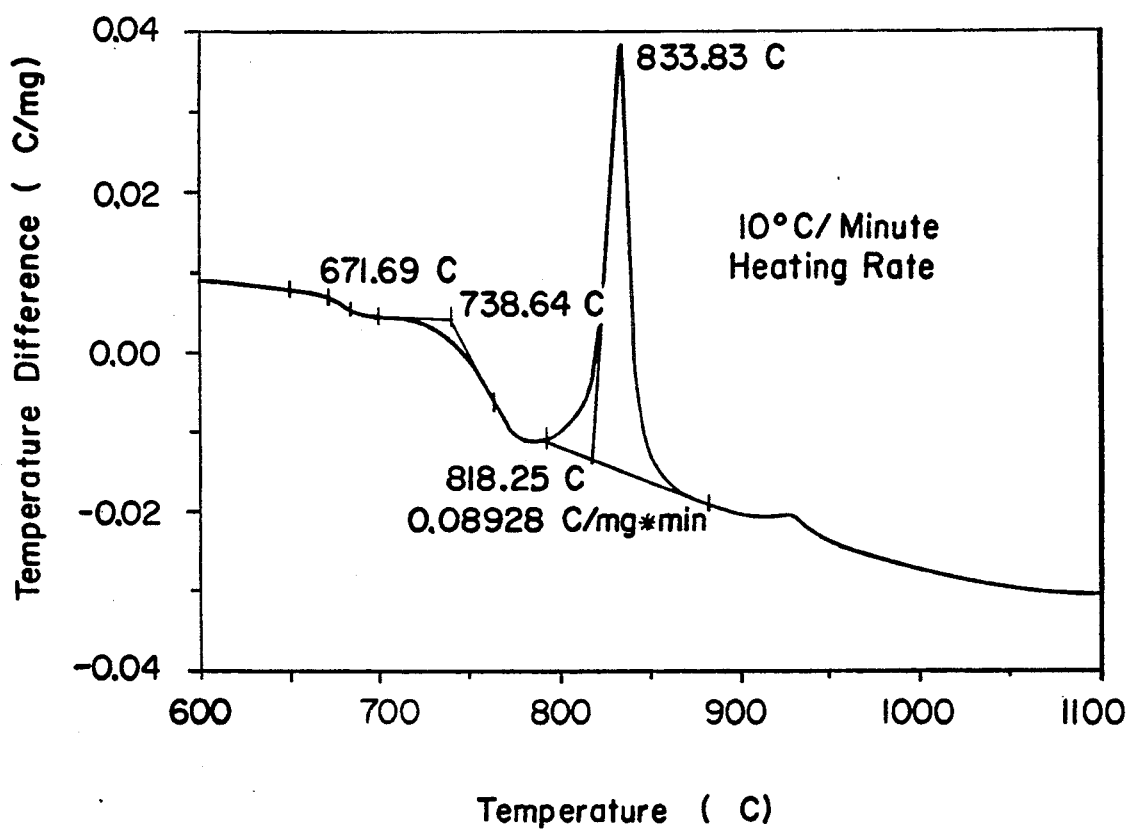
FIG. 3 is a graphical representation of the differential thermal analysis of the glass of Example 2.
Figure 4:
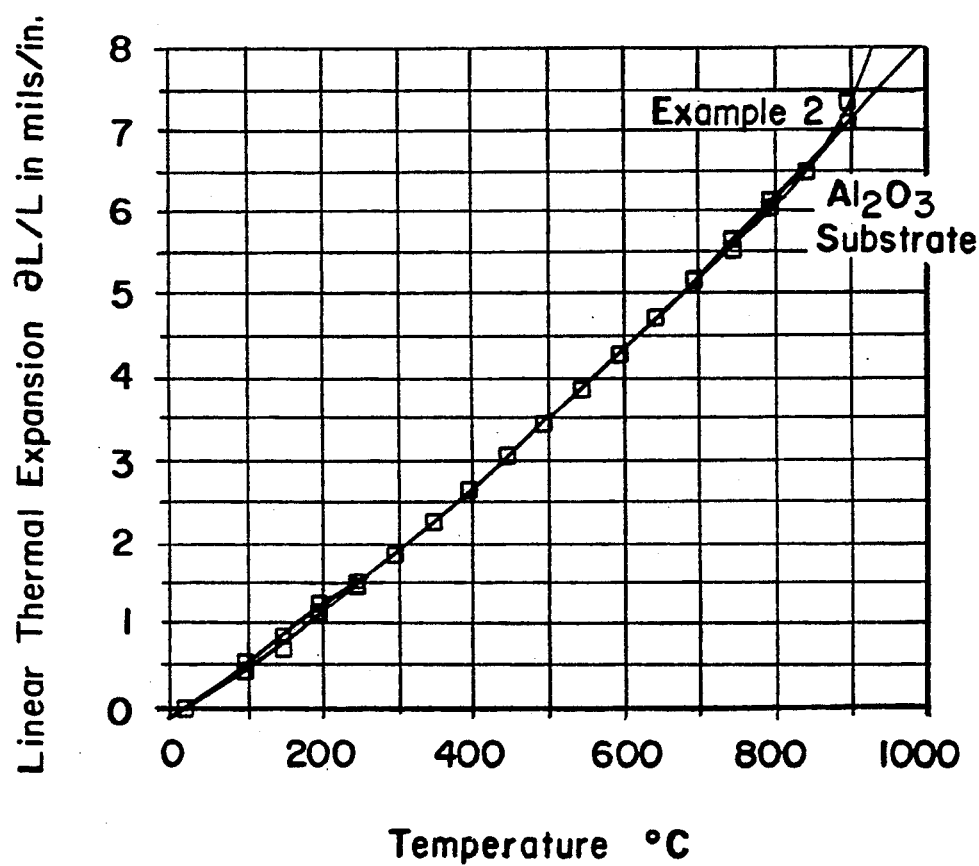
FIG. 4 is a graphical correlation of the linear thermal expansion of the glass of Example 2 as a function of temperature.

The compositions within the a-c-d-f region have the required SiO$_2$, ZnO, and CaO ratios to have complete densification and crystallization, with softening at a high enough temperature to insure complete burnout, and thermal expansion matched to alumina. This all happens in a single firing at 850° or 900° C. with no significant change occurring on refires. FIGS. 3 and 4 show the DTA and thermal expansion data for Example 2, demonstrating the ideal behavior that can be achieved with compositions in the preferred region in the calcium zinc silicate system. The DTA in FIG. 3 shows softening and the onset of densification occurring at 739° C., high enough to insure complete organic burnout, followed by an endothermic shift corresponding to complete densification. A separation occurred between the completion of densification and the onset of crystallization. A sharp exothermic peak occurs with a peak temperature at 834° C. corresponding to the crystallization of hardystonite and zinc silicate phases. FIG. 4 shows the excellent thermal expansion match of this composition with an alumina substrate from 22° to 900° C.

EXAMPLES 1-4

In U.S. Pat. No. 4,323,652, Baudry et al. disclose a crystallizable glass composition within the calcium zinc silicate system which is outside the range of applicant's invention. (See the point in FIG. 1 labelled Baudry et al.). This glass was made in the manner described hereinabove. The physical and electrical properties were measured and compared with those of Examples 1–4. These data are given in Table 3 below:

TABLE 3

Properties of CaO—ZnO—SiO$_2$ Compositions

| Example No. | 1 | 2 | 3 | 4 | Baudry et al. |
|---|---|---|---|---|---|
| Properties | | | | | |
| Leakage Current ($\mu$A/cm$^2$) | <1 | <1 | <1 | <1 | <1 |
| Breakdown Voltage (KV/25 $\mu$m) | — | 2.2 | 1.5 | 1.6 | 2.3 |
| Insulation Resistance (10$^{12}$ $\Omega$) | — | — | 30 | 54 | — |
| Dielectric Constant | — | 8.3 | 9.4 | 7.6 | 7.4 |
| Dissipation Factor (%) | — | 0.19 | 0.20 | 0.41 | 0.19 |
| TCE (10$^{-7}$/°C.) | 67.0 | 79.2 | 73.3 | 60.5 | 66.9 |
| Yellow Spreading Stain | None | Slight | Very Slight | Moderate | Moderate |
| Interfacial Stain | Brown | Brown | Yellow Brown | Yellow Brown | Brown |

As shown in FIG. 1, Baudry et al.'s composition falls outside the preferred region and has a low TCE. This composition had a TCE of 66.9×10$^{-7}$/°C., which is in good agreement with the value of 64.6×10$^{-7}$/°C. reported by Baudry et al. This low TCE would cause unacceptable bowing with alumina substrate in a thick film circuit. Baudry et al.'s patent covered the use of this devitrifiable composition as a component of a mixture of glasses.

Table 3 lists the properties of Examples 1–4 and Baudry et al.'s devitrifiable composition. These properties were measured on test circuits fabricated with the dielectric compositions with QS170 used as the conductor. (QS170 is a tradename of the Du Pont Company for a Pt/Ag thick film paste for use as a substrate conductor.) The circuits were fired in a belt furnace with a peak temperature of 850° C. for 10 minutes with a total firing time of 30 minutes. The dielectric thicknesses were approximately 30 $\mu$m.

All compositions show very low leakage currents less than 1 $\mu$A/cm$^2$ (often as low as 0.001 $\mu$A/cm$^2$), indicating that complete densification occurs. SEM microstructures also confirm this, although a small percentage of closed porosity is present with less than ½ $\mu$m sized pores. These compositions have high values of breakdown voltage (>1 KV/mil), and insulation resistances (>10$^{12}$ $\Omega$). The dielectric constant is less than 10, with a dissipation factor less than 0.5%.

The TCE values listed in Table 3 show that Examples 2 and 3 have expansions close to alumina and fall in the preferred compositional region shown in FIG. 1. Examples 1 and 4, and Baudry et al.'s composition have low expansions and thus fall outside the preferred region. Baudry et al.'s composition has a DTA softening temperature of 762° C. with a major crystallization peak at 870° C., and a minor peak at 908° C. Thus in addition to a low TCE, this composition does not crystallize completely in one firing at 850° C.

Some discoloration or staining of the dielectrics occur when fired with Ag conductors because of Ag migration into the dielectric. Two types of staining occur: yellow discoloration in the dielectric away from the conductor areas, and an interfacial discoloration occuring at the dielectric-conductor interface. A summary of these two types of staining for the calcium zinc silicate compositions is listed in Table III. These types of staining appear not to affect the properties or reliability of the dielectrics, but are cosmetically undesirable.

Additions of other oxides to the composition can be used to eliminate both types of staining.

Separate test circuits are used to test the leakage current and the electrical properties (BDV, I.R., K, and D.F.). The leakage current circuit consists of a conductor on the alumina substrate with two dielectric layers covering the conductor. The electrical circuit is similar, except that a top conductor layer is also used on the dielectric. The electrical circuits fabricated with Example 1 blistered, while the leakage current circuits did not. This blistering appears to be a potential problem with compositions made entirely from calcium zinc silicate. Example 1 was the only composition that blistered during the fabrication of the circuit. However, the other compositions will blister after repeat firings. This blistering appears to occur because of interaction of the constituents of the conductor with the dielectric.

The blistering varies with conductor used. Additions of other oxides to the calcium zinc silicate system can be used to eliminate this type of blistering as will be described in the next two sections.

Another type of blistering of dielectrics can occur when conductors of different metals are used in circuits. Blistering would occur, for example, if Au is used as the bottom conductor and Ag as the top conductor in the electrical test circuit described earlier. This circuit is referred to as a mixed metallurgy blister test circuit. Most dielectrics do not blister during the initial firing of the top conductor, but may blister after refires. The number of firings until blistering occurs is referred to as the mixed metallurgy blister resistance. This blister resistance should be greater than the number of firings that occur during the manufacture of multilayer circuits.

Mixed metallurgy blistering occurs due to the electromotive force (EMF) that is generated between the different metallurgies at high temperatures. This EMF promotes chemical reactions that produce gaseous species (probably O$_2$) that result in blistering of the circuits. The chemical reactions depend on the compositions of the dielectric and conductor. Since an EMF is required the blistering only occurs between conductors of different metallurgy. If the conductors are shorted an EMF will not be produced and blistering will not occur.

The calcium zinc silicate compositions of Examples 1–4 do not blister due to mixed metallurgy (with Au and Ag conductors) until 10–20 firings. The first type of blistering, which is on a much finer scale, may be artificially causing the mixed metallurgy blister resistance to be higher. Several additives can be used to eliminate the non-mixed metal blistering, and then the mixed metallurgy blister resistance can be more accurately evaluated, as described hereinbelow.

BaO and ZrO$_2$ Additions

Additions of other oxides to the basic calcium zinc silicate system cause the region shown in FIG. 1 to shift and change shape. BaO behaves like a glass modifier similar to CaO, and thus the addition of BaO with the CaO, ZnO, and SiO$_2$ ratios kept constant causes the preferred region to shift away from CaO. Effectively less CaO is needed, when BaO is added, to have similar densification, crystallization, and thermal expansion behavior. ZrO$_2$ behaves like a glass former similar to SiO$_2$, and thus the addition of ZrO$_2$ causes the preferred region to shift away from SiO$_2$.

Examples 5-14 in Table 1 show the effects of BaO and $ZrO_2$ additions to the basic calcium zinc silicate system. Examples 15-32 and 33-54 show the effect of BaO and $ZrO_2$ additions when $Al_2O_3$ and/or $P_2O_5$ are also added (these compositions will be described in more detail in the next section). Additions of 0-6 weight % BaO and 0-10 weight % $ZrO_2$ were found to give acceptable dielectric properties. No more than 5% weight BaO is preferred.

The addition of BaO and $ZrO_2$ improves the performance of the basic calcium zinc silicate compositions in the following ways:

Yellow spreading stain is eliminated;
The discoloration seen at the dielectric/conductor interface is reduced;
The non-mixed metallurgy blistering is eliminated;
The separation in crystallization temperature of hardystonite and the zinc silicate phases is reduced; and
The temperature range between densification and crystallization can be controlled by varying the amount of BaO and $ZrO_2$ additions without changing the CaO, ZnO, and $SiO_2$ ratios.

TABLE 4

Properties of $CaO-ZnO-SiO_2$ Compositions with BaO and $ZrO_2$ Additions

| Example No. | 10 | 11 | 12 | 13 | 14 |
|---|---|---|---|---|---|
| Properties | | | | | |
| Leakage Current ($\mu A/cm^2$) | <1 | <1 | <1 | <1 | <1 |
| Breakdown Voltage (KV/25 $\mu m$) | 1.7 | 2.8 | 1.1 | 1.7 | 2.2 |
| Insulation Resistance ($10^{12}$ Ω) | 22 | 31 | 18 | 32 | 31 |
| Dielectric Constant | 8.3 | 8.7 | 8.8 | 8.6 | 8.6 |
| Dissipation Factor, (%) | 0.10 | 0.10 | 0.32 | 0.22 | 0.17 |
| TCE ($10^{-7}$/°C.) | 70.3 | 81.6 | 72.3 | 79.6 | 80.8 |

Table 4 lists the dielectric properties of Examples 10-14 showing that excellent properties of low leakage current, low dissipation factor, high breakdown voltage, and high insulation resistance are achieved with BaO and $ZrO_2$ additions to the compositions in the calcium zinc silicate system. None of these compositions have yellow spreading discoloration, but some interfacial staining may occur. As described below, interfacial staining can be eliminated by the additions of $Al_2O_3$ and $P_2O_5$.

With the elimination of the non-mixed metallurgy blistering that occurs with the basic calcium zinc silicate compositions, the mixed metallurgy blister resistance could be evaluated. Examples 10-14 withstood 5-9 firings before blistering occurred. This is a substantial improvement over the present commercial dielectrics which often blister during the first or second firing.

Example 11 with a peak crystallization temperature of 838° C. is a preferred composition for an 850° C. firing. Examples 13 and 14 with peak crystallization temperatures of 896° and 874° C. are preferred compositions for a 900° C. firing. These three examples also have excellent expansion match to alumina.

Another requirement of a thick film circuit is good thermal aged soldered adhesion between the top conductor and the underlying dielectric. The adhesion of typical commercial Ag and Pd/Ag conductors to the calcium zinc silicate compositions with and without BaO and $ZrO_2$ additions as described above is poor. However, $Al_2O_3$ and $P_2O_5$ additions can be used to improve thermal aged soldered adhesion of conductors, as described below.

$Al_2O_3$ and $P_2O_5$ Additions

As occurs with the BaO and $ZrO_2$ additions, the preferred region in the calcium zinc silicate system will shift with the addition of $Al_2O_3$ and/or $P_2O_5$. Additions of 0.1-10 weight % $Al_2O_3$ and 0.1-5 weight % $P_2O_5$ were found to give acceptable dielectric properties. Both of these additives act like glass formers similar to $SiO_2$ and $ZrO_2$, and thus the preferred region shifts away from $SiO_2$.

The addition of $Al_2O_3$ and $P_2O_5$ to the compositions in the calcium zinc silicate system, along with BaO and $ZrO_2$, substantially improves thermal aged soldered adhesion. The $Al_2O_3$ and $P_2O_5$ addition will eliminate staining without BaO and $ZrO_2$ additions, but BaO and $ZrO_2$ are still needed for enhancement of the other properties described earlier.

Examples 15-54 show the effect on the softening and crystallization temperatures and TCE arising from the addition of $Al_2O_3$ and/or $P_2O_5$ to the calcium zinc silicate system with or without BaO and $ZrO_2$ additions. In general the addition of $Al_2O_3$ and/or $P_2O_5$ increases the softening and crystallization temperatures and lowers the TCE. Thus to avoid change in these properties other adjustments in the composition are also necessary, such as replacing some of the $SiO_2$ with $Al_2O_3$ and/or $P_2O_5$.

TABLE 5

Properties of $CaO-ZnO-SiO_2$ Compositions with BaO, $ZrO_2$, $Al_2O_3$, and $P_2O_5$ Additions

| Example No. | 11 | 47 | 49 | 53 |
|---|---|---|---|---|
| Compositions | | | | |
| $Al_2O_3$ (weight %) | 0 | 0.36 | 0.71 | 1.41 |
| $P_2O_5$ (weight %) | 0 | 0.49 | 0.99 | 1.97 |
| Properties | | | | |
| Leakage Current ($\mu A/cm^2$) | <1 | <1 | <1 | <1 |
| Breakdown Voltage (KV/25 $\mu m$) | 2.8 | 1.8 | 1.5 | 1.8 |
| Insulation Resistance ($10^{12}$ Ω) | 31 | 11 | 18 | 4 |
| Dielectric Constant | 8.7 | 8.8 | 8.3 | 8.0 |
| Dissipation Factor, (%) | 0.10 | 0.10 | 0.10 | 0.32 |
| TCE ($10^{-7}$/°C.) | 81.6 | 82.8 | 80.5 | 79.5 |
| Conductor Adhesion (Newtons)* | | | | |
| Separately Fired | 5 | 7 | 9 | 15 |
| Co-Fired | 13 | 17 | 20 | 22 |

*Using Du Pont 6134 Ag/Pd thick film conductor paste.

Table 5 shows the properties of a series of compositions with increasing amounts of $Al_2O_3$ and $P_2O_5$ additions to Example 11. With the addition of $Al_2O_3$ and $P_2O_5$ the crystallization shifts to higher temperatures due to the increased viscosity caused by these additives. Example 49 with 0.71 weight % $Al_2O_3$ and 0.99 weight % $P_2O_5$ still crystallizes completely in one firing at 850° C. With twice the amount of $Al_2O_3$ and $P_2O_5$ (Example 46) the crystallization shifts to even higher temperatures, and the hardystonite and zinc silicate crystallization peaks split. Complete crystallization does not occur at 850° C. in one firing for this composition, but would be complete in one firing at 900° C.

Table 5 also shows that the leakage current remains very low (<1 $\mu A/cm^2$) with the addition of $Al_2O_3$ and $P_2O_5$. The breakdown voltage and insulation resistance decrease, but are still at high levels. The dissipation factor remains constant until the largest amount of $Al_2O_3$ and $P_2O_5$ is added (Example 53). This increase in dissipation factor is probably due to less crystallization that occurs at 850° C. for this composition. The mixed metallurgy blister resistance appears to decrease slightly with the $Al_2O_3$ and $P_2O_5$ addition.

In addition to eliminating the interfacial discoloration, $Al_2O_3$ and $P_2O_5$ promote adhesion with Ag and AgPd conductors. Table 5 shows that the adhesion with 6134 AgPd conductor increases with the addition of $Al_2O_3$ and $P_2O_5$ from 5 to 15 Newtons when the dielectric and conductor layers are separately fired, and from 13 to 22 Newtons when the layers are cofired. Due to the difference in crystallization temperature, Example 49 is a preferred composition for an 850° C. firing, and Example 53 is preferred for 900° C. firing.

Effect of Impurities

To investigate the effect of common impurities on the properties of glasses described in this patent, the glass of Example 11 was modified with 0.3 wt % each of $Na_2O$, $B_2O_3$, $Fe_2O_3$ or PbO. Glasses prepared with impurities at these levels did not show any change in densification or crystallization behavior. Also, no change in electrical properties of glasses was observed. Example 9 was modified with each of the following oxides: 0.1 mole % of $MoO_3$, or 0.5 mole % of $Fe_2O_3$, $K_2O$, $MnO_2$, $Cr_2O_3$, $La_2O$, $CeO_2$, $Y_2O_3$, or $Co_3O_4$. None of these additives had a significant effect on the DTA softening or crystallization temperature, showing insensitivity of calcium zinc silicate based glasses to impurities. These data show that small amounts of commonly occurring impurities such as alkali ions, alkali earth ions, B, Fe, Pb etc. will not cause a significant change in densification, crystallization and electrical properties of glasses of the invention.

Multiple Fire Stability of Compositions

The compositions listed in Table 1 with their first crystallization peak temperature less than 860° C. crystallized completely in first firing at 850° C. with no further changes in subsequent firings. The multiple fire stability of the glass of Example 49, which has its first exothermic DTA peak at 859° C. was examined by firing the dielectric at 850° C. several times and by recording the x-ray diffraction patterns after each firing. The x-ray diffraction patterns did not shown any changes in crystalline phases after the first firing at 850° C. This indicates that the sample was fully devitrified to a composite of crystal and remnant glass in the first firing itself. The electrical properties of dielectrics formulated with this glass did not show any changes when the properties of dielectrics were measured on samples fired more than once at 850° C. Firing the dielectric more than once at 850° C. did not have any significant effect on other properties such as thermal aged adhesion of conductors. This shows the excellent stability of these compositions for use in multilayer circuits requiring several firings.

In a similar way, compositions listed in Table 1, with their first crystallization peak temperature greater than 860° C., are suitable for formulating dielectrics which can be fired at 900° C. These compositions crystallize completely in one firing at 900° C., with no changes in subsequent firings.

The Strontium Zinc Silicate System

For all the glass compositions in the $CaO-ZnO-SiO_2$ system listed in Table 1, CaO can be substituted by SrO, either partially or completely, with improvement in some of the electrical properties as described in this section.

Compositions in which a large amount of CaO is substituted by SrO crystallize $SrZn_2SiO_7$ phase also in addition to hardystonite ($Ca_2ZnSi_2O_7$) and willemite ($Zn_2SiO_4$) phases. Example 55 in Table 1 describes a composition in which CaO is completely substituted by SrO. Glasses in which CaO is partially substituted by SrO show similar electrical properties as examples in $CaO-ZnO-SiO_2$ system described in earlier sections. In addition, similar to the glass compositions in the $CaO-ZnO-SiO_2$ system, combined additions of $BaO+ZrO_2$ and/or $Al_2O_3+P_2O_5$ can be made to improve certain properties as described in earlier sections. The individual mole percentages of CaO, SrO and/or BaO can be varied to optimize the expansion match of the dielectric to the alumina substrate. Examples 55 to 99 in Table 1 describe compositions in which CaO is substituted partially or completely with SrO, with some of the examples illustrating the effect of BaO, $ZrO_2$, $Al_2O_3$ and/or $P_2O_5$ on crystallization temperature and TCE.

Table 6 lists the properties of examples of glasses in the $SrO-ZnO-SiO_2$ system, modified by BaO and $ZrO_2$. Example 55 corresponds to a glass composition with stoichiometric mole percentages of SrO, ZnO and $SiO_2$ as in the $SrZn_2Si_2O_7$ phase. All the examples shown in Table 6 would crystallize completely in the first firing at 850° C. and dielectrics can be formulated with these glasses with excellent electrical properties. The TCE of Example 55 is low compared to that of alumina substrate and would lead to substrate bowing. The expansion of Example 55 can be corrected by altering the ratio of SrO, ZnO and $SiO_2$ or by the addition of other alkaline earth oxides. In Example 56 in Table 1, a TCE match to alumina substrate was achieved by changing the ratio of SrO/ZnO. Example 70 shows that an increase in TCE can be achieved by both changing the ratio of SrO/ZnO with minor addition of BaO. The combined addition of BaO and $ZrO_2$ as in Example 70 would reduce the interfacial stain when fired with Ag conductors, similarly to the effect observed for compositions in the $CaO-ZnO-SiO_2$ system.

TABLE 6

Properties of $SrO-ZnO-SiO_2$ Compositions And/Or BaO, $ZrO_2$, $Al_2O_3$, $P_2O_5$ Additions

| Example No. | 55 | 56 | 57 |
|---|---|---|---|
| Properties | | | |
| Crystallization Temperature (°C.) | 790 | 792 | 808 |
| Breakdown Voltage (KV/25 $\mu$m) | 2.5 | 2.0 | 1.8 |
| Insulation Resistance ($10^{12}$ Ω) | 4 | 28 | 26 |
| Dielectric Constant | 7.9 | 8.1 | 10.3 |
| Dissipation Factor (%) | 0.12 | 0.07 | 0.08 |
| TCE ($10^{-7}$/°C.) | 60.5 | 79.3 | 73.5 |

Several examples shown in Table 1 containing SrO, BaO and/or CaO and $Al_2O_3$ modifiers crystallize completely at 850° C. firing and show TCE in the range 70–80. Dielectrics can be formulated with these glasses or mixtures of these glasses for 850°–900° C. firing.

SrO and $Al_2O_3$ Additions

The mixed metal EMF blistering performance of all the compositions in the $CaO-ZnO-SiO_2$ system listed in Table 1 improves significantly by the combined additions of SrO and $Al_2O_3$ to these glasses. Example 11 listed in Table 1 would blister after 10 firings in the mixed metal blister test with a Au conductor as the bottom layer and a Ag conductor as the top layer. Example 83 listed in Table 1, which is a modification of Example 11 by 4 mole % each of SrO and $Al_2O_3$ did not blister even after 60 firings. The examples shown in Table 1 containing both SrO and $Al_2O_3$ modifiers can be used to formulate dielectrics with improved performance in mixed metal blistering.

Preferred Compositional Region to Formulate Dielectrics

As described in the previous sections, dielectrics satisfying most of the requirements for 850°–900° C. firing can be formulated by selecting compositions in the preferred compositional region in the CaO-ZnO-$SiO_2$ system. Further CaO can be substituted partially or completely by SrO with enhancement in certain properties. Further, 0–15 mole % of CaO can be substituted by MgO without significant change in any of the properties. In compositions containing CaO, SrO and/or MgO, the preferred compositional region would change because of the effect of SrO and MgO on TCE and crystallization temperature. Several examples in which both CaO and MgO are added are listed in Table 1. The preferred compositional region for a system containing CaO, MgO and/or SrO is shown in FIG. 2. The preferred compositional region shown in FIG. 2 can be defined by a set of boundary conditions described below for each of the individual constituents in terms of their mole percentages.

| | |
|---|---|
| MgO | 0–15 |
| $Al_2O_3$ | 0–3 |
| ZnO | 20–36 |
| Glass Formers and Conditional Glass Formers + $Al_2O_3$ | 40–48 |
| CaO + SrO + MgO | 19–33 |

The glass formers and conditional glass formers are a mixture of at least 34 mole % $SiO_2$ with no more than 6 mole % $HfO_2$, 4 mole % $P_2O_5$, 10 mole % $TiO_2$, and 6 mole % $ZrO_2$ or mixtures thereof with the proviso that it contains at least 0.5 mole % $ZrO_2$.

For compositions containing BaO also in addition to CaO, SrO and/or MgO, the preferred compositional region would be influenced strongly by the mole percentage of BaO. BaO oxide acts as a strong modifier and the TCE of the composition would be sensitive to the mole % of BaO in a more significant way than either SrO or MgO substitution for CaO. The preferred compositional region for 850°–900° C. firing dielectrics would vary continuously with the amount of mole % of BaO.

In the case of alkaline earth zinc silicate glasses containing BaO as one of the modifiers in addition to CaO, SrO and MgO, the preferred compositional region is modified as described by the following set of boundary conditions, defined in terms of mole % of individual constituents.

| | |
|---|---|
| MgO | 0–6% |
| BaO | 0–6% |
| $Al_2O_3$ | 0–(3 + 2/3 mole % of BaO) |
| ZnO | 20–(36 – 1/3 mole % of BaO) |
| Glass + $Al_2O_3$ | 40–(48 + mole % of BaO) |
| CaO + SrO + MgO + BaO | 19–(33 + 1/2 mole % of BaO) |

We claim:

1. An amorphous partially crystallizable alkaline earth zinc silicate glass consisting essentially of a composition falling within the area defined on a weight points g-l of FIG. 2 of the drawing, in which:
   (1) alpha is $SiO_2$ in admixture with a glass former or conditional glass former selected from the group consisting of no more than 3% $Al_2O_3$, 6% $HfO_2$, 4% $P_2O_5$, 10% $TiO_2$, 6% $ZrO_2$ and mixtures thereof, with the proviso that the composition contains at least 0.5% $ZrO_2$;
   (2) beta is an alkaline earth selected from CaO, SrO, MgO, BaO and mixtures thereof, with the proviso that the composition contain no more than 15% MgO and no more than 6% BaO; and
   (3) gamma is ZnO, the loci of points g-l being as follows:

| Point | Alpha | Beta | Gamma |
|---|---|---|---|
| g | 48.0 | 32.0 | 20.0 |
| h | 46.0 | 34.0 | 20.0 |
| i | 40.0 | 34.0 | 26.0 |
| j | 40.0 | 24.0 | 36.0 |
| k | 46.0 | 18.0 | 36.0 |
| l | 48.0 | 19.0 | 33.0 |

2. The glass of claim 1 in which:
   (1) alpha contains $Al_2O_3$ up to 3% plus ⅔ of the % of BaO if any; and constitutes with respect to the total glass composition no more than 48% plus the % of BaO;
   (2) beta contains up to 6% BaO and constitutes with respect to the total glass composition no more than 33% plus ½ of the % of BaO if any; and
   (3) gamma constitutes no more than 36% minus ⅓ of the % of BaO if any.

3. The glass of claim 1 or 2 which contains both $Al_2O_3$ and $P_2O_5$ added as $AlPO_4$ or $AlP_3O_9$.

4. The glass of any of claims 1 or 2 having dispersed therein an inorganic filler.

5. A composition for the preparation of the glass of claim 1 consisting essentially of an admixture of finely divided particles of the oxides of Ca, Zn and Si in the stoichiometric portions of the area defined by points g-l of FIG. 2, the loci of points g-l being as follows:

| Point | Alpha | Beta | Gamma |
|---|---|---|---|
| g | 48.0 | 32.0 | 20.0 |
| h | 46.0 | 34.0 | 20.0 |
| i | 40.0 | 34.0 | 26.0 |
| j | 40.0 | 24.0 | 36.0 |
| k | 46.0 | 18.0 | 36.0 |
| l | 48.0 | 19.0 | 33.0 |

6. The composition of claim 5 in which CaO, ZnO and $SiO_2$ are in the form of hardystonite and willemite.

7. The composition of either claim 5 or 6 in admixture with 3–15% wt. of finely divided particles of MgO, SrO, up to 6% BaO or mixtures thereof.

8. The composition of either of claims 5 or 6 in admixture with 0.5–10% wt. $TiO_2$, $ZrO_2$, $HfO_2$, $Al_2O_3$, $P_2O_5$ or mixtures thereof.

9. The composition of claim 7 containing $Al_2O_3$ and $P_2O_5$ in the form of $AlPO_4$ or $AlP_3O_9$.

10. A dielectric thick film composition comprising finely divided particles of the amorphous crystallizable glass of claim 1 dispersed in an organic medium.

11. A dielectric thick film composition of paste consistency comprising the composition of claim 5 dispersed in an organic medium.

12. A dielectric green tape comprising a cast layer of the finely divided particles of the composition of claim 1 dispersed in a volatilizable solid polymeric binder.

13. A composition for the preparation of green tape by the casting method comprising finely divided particles of the glass of claim 1 dispersed in a liquid solution of volatilizable polymeric binder and volatile solvent.

* * * * *